L. B. STILLWELL.
SYSTEM AND DEVICE FOR INDICATING TRAIN MANIPULATION.
APPLICATION FILED FEB. 3, 1906.

936,488.

Patented Oct. 12, 1909.
6 SHEETS—SHEET 2.

L. B. STILLWELL.
SYSTEM AND DEVICE FOR INDICATING TRAIN MANIPULATION.
APPLICATION FILED FEB. 3, 1906.

936,488.

Patented Oct. 12, 1909.
6 SHEETS—SHEET 3.

WITNESSES:
Robert Head
W. A. Pauling

INVENTOR
Lewis B. Stillwell
BY Gifford & Phele
ATTORNEYS

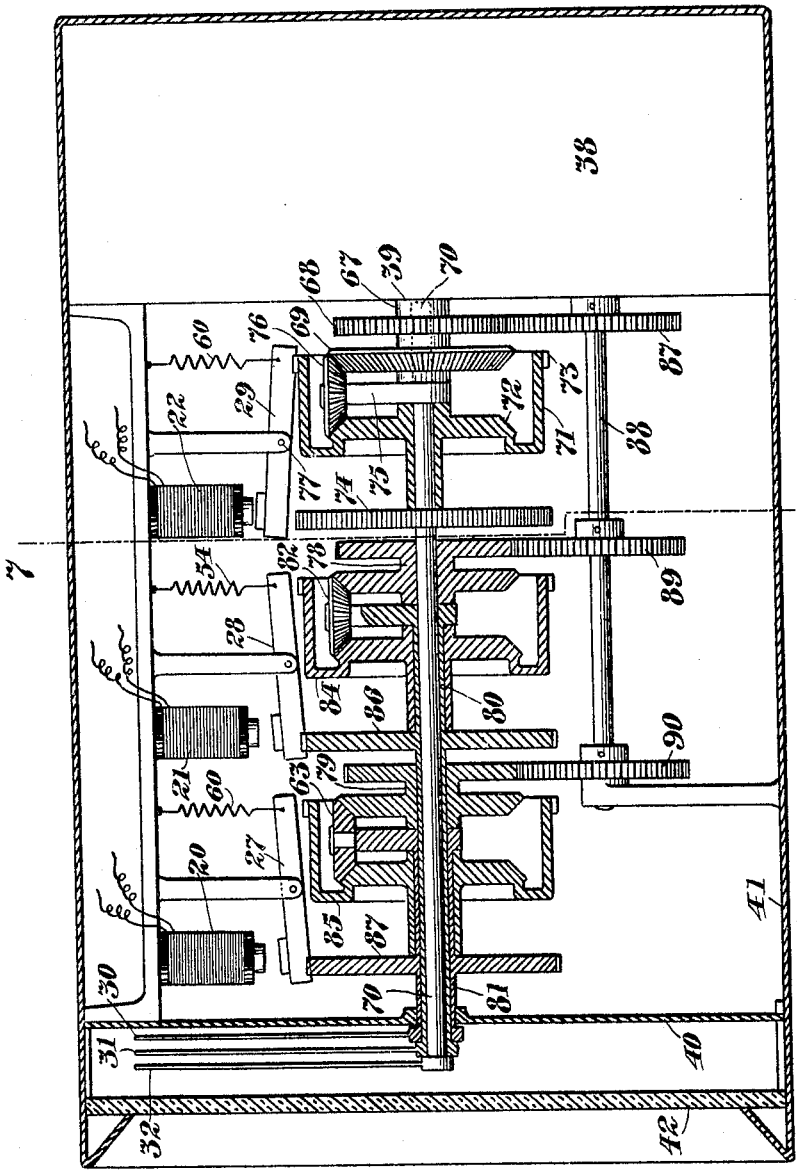

L. B. STILLWELL.
SYSTEM AND DEVICE FOR INDICATING TRAIN MANIPULATION.
APPLICATION FILED FEB. 3, 1906.
936,488.
Patented Oct. 12, 1909.
6 SHEETS—SHEET 6.
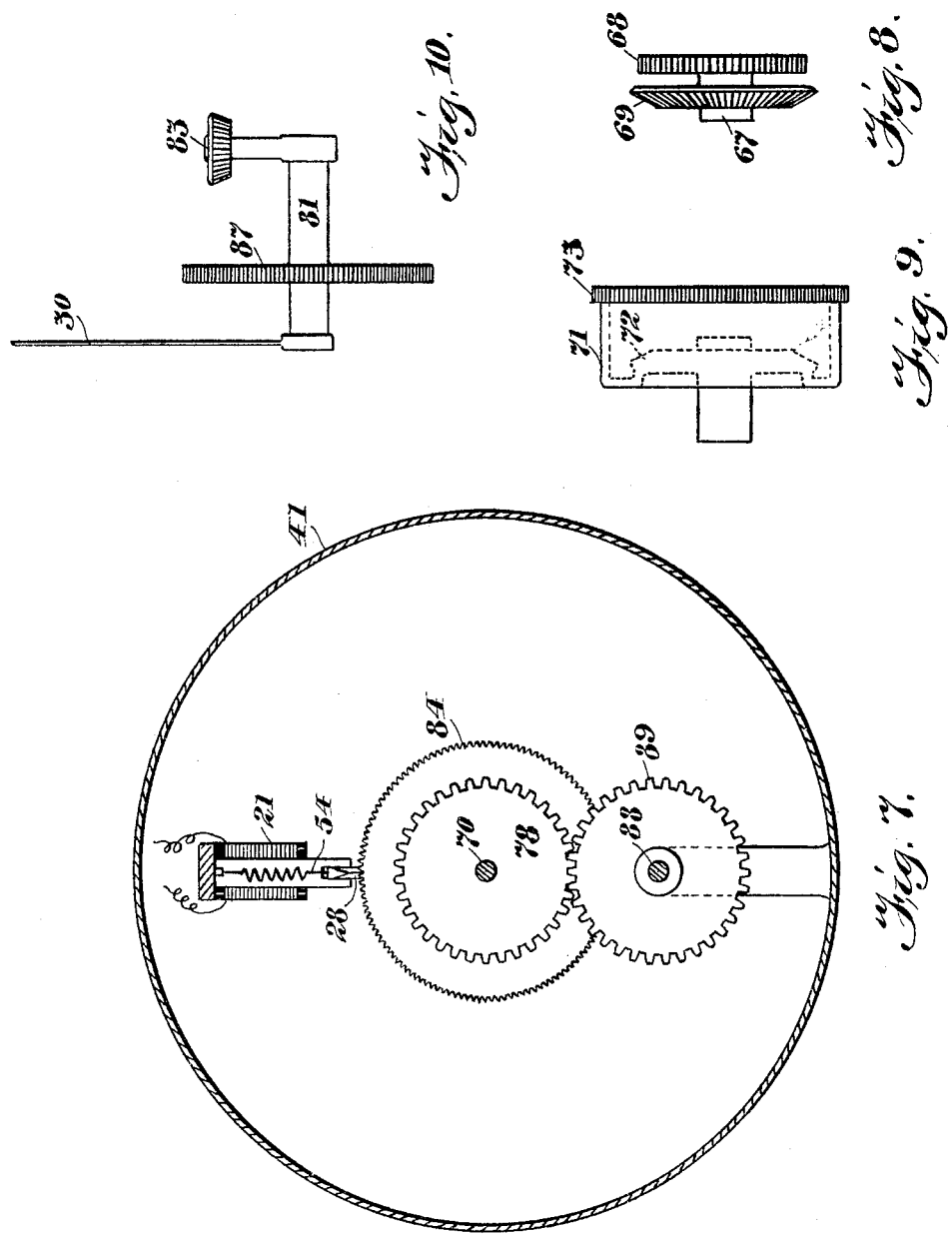

UNITED STATES PATENT OFFICE.

LEWIS B. STILLWELL, OF LAKEWOOD, NEW JERSEY.

SYSTEM AND DEVICE FOR INDICATING TRAIN MANIPULATION.

936,488.

Specification of Letters Patent.   Patented Oct. 12, 1909.

Application filed February 3, 1906. Serial No. 299,261.

*To all whom it may concern:*

Be it known that I, LEWIS B. STILLWELL, a citizen of the United States, and a resident of Lakewood, in the county of Ocean and State of New Jersey, have invented certain new and useful Improvements in Systems and Devices for Indicating Train Manipulation, of which the following is a specification.

My invention relates to indicating train manipulations and it consists in certain novel systems and certain novel parts and combinations of parts particularly pointed out in the claims concluding this specification.

The time-period covered by a train or car in passing from a state of rest at the start, to a state of rest at the next stop, may be divided into several parts, such as, for example: the period of acceleration; the period of normal or continuous running; the period of drifting, or motion without the application of power; and the period of braking. The running period might be divided into other parts, or the parts named might be subdivided for more critical analysis. For a given run under the best conditions there is a certain proportion of the total time consumed that may be apportioned to each selected period, with the result of making the run with the minimum expenditure of energy; and it is for the purposes of ascertaining if these conditions have been observed by the train operator that my novel system and apparatus have been devised.

In the accompanying drawings I have shown my invention applied in forms which are at present preferred by me in connection with a direct-current traction system, involving series-parallel connection of motors, since that is the type of traction system now generally employed in this country; and it is in connection with such a system that I will describe my invention. It will, however, be understood that my invention is equally applicable to polyphase systems, in which single and cascade connections of motors are employed instead of series-parallel connections; or to single phase systems in which devices are used to control the electromotive force applied; or to any other suitable arrangement or manipulation of elements.

Figure 1:
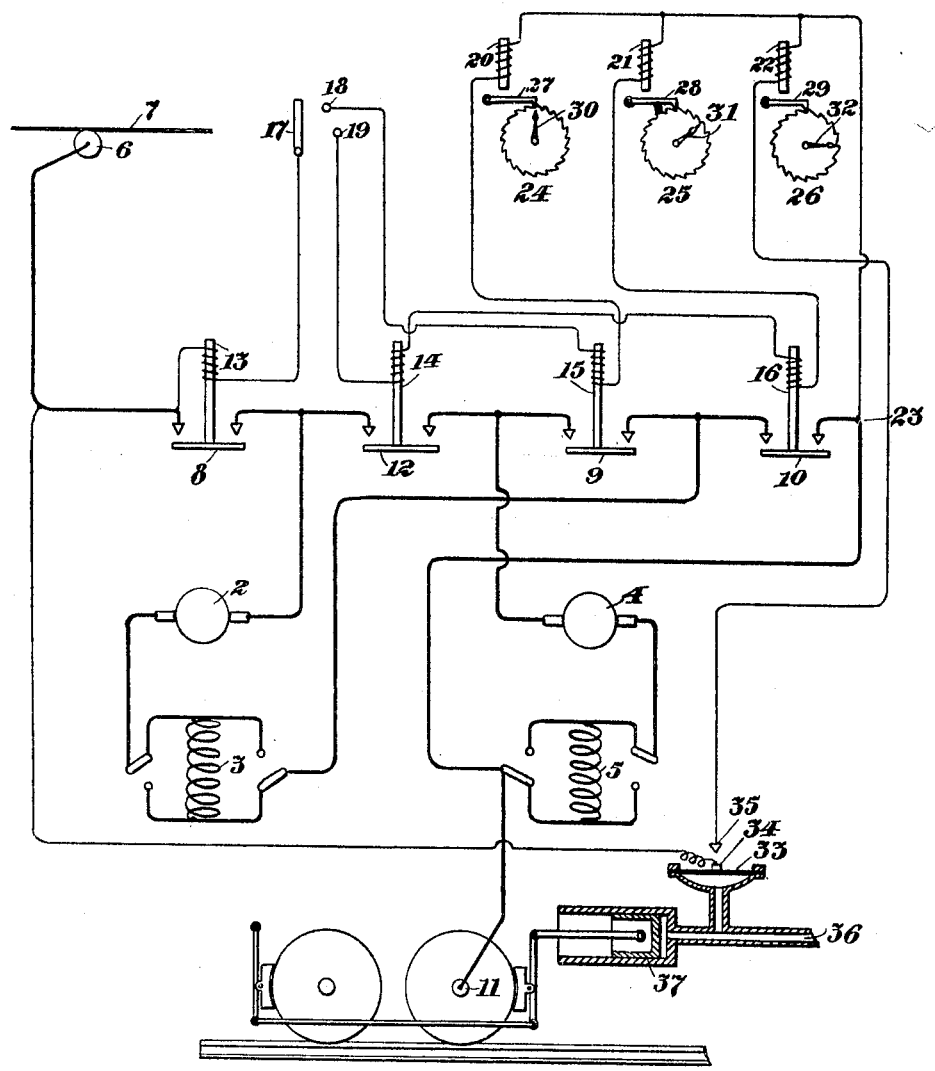
Figure 2:
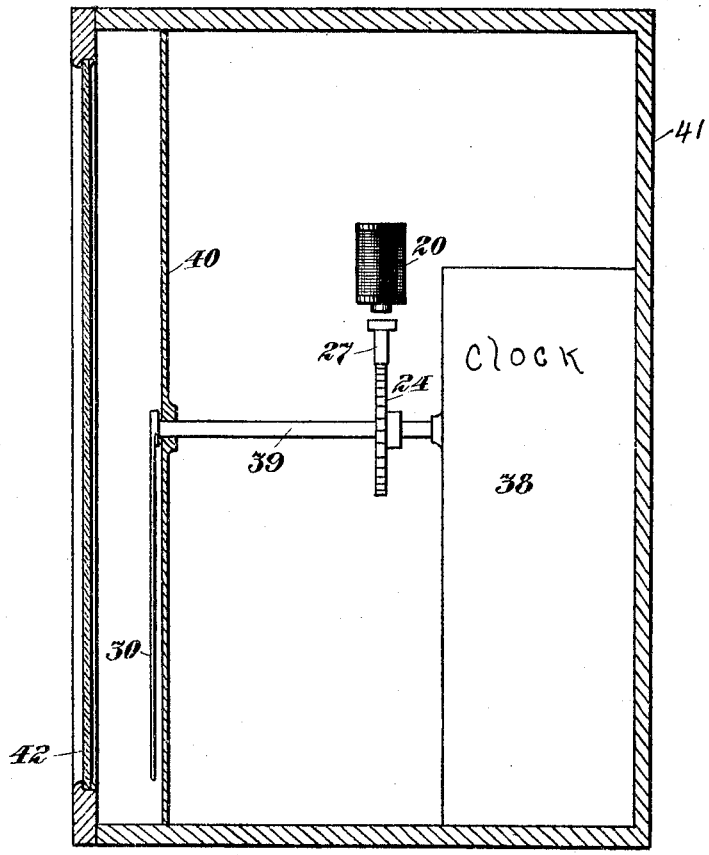
Figure 3:
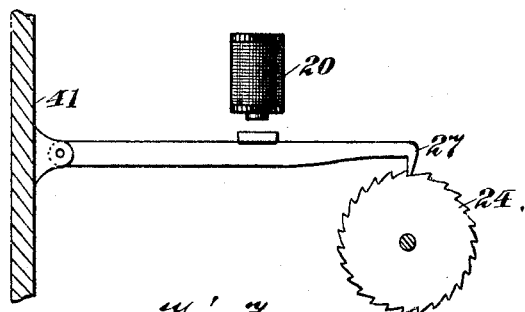
Figure 4:
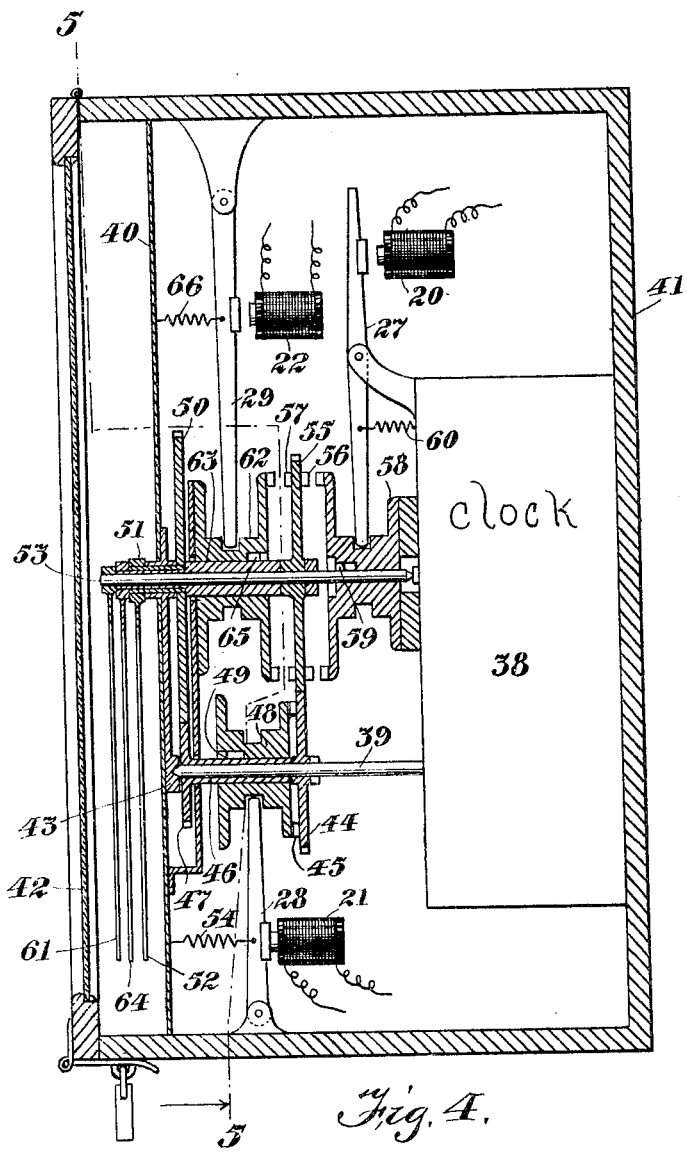
Figure 5:
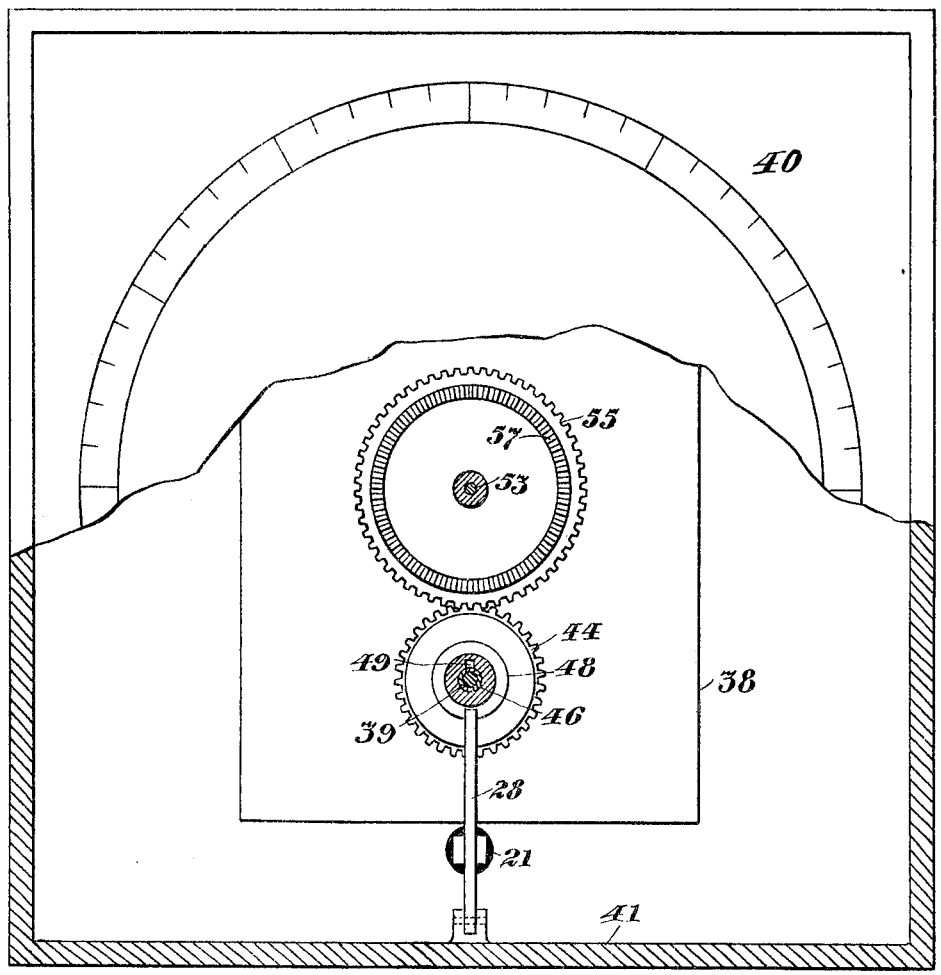

Referring to the drawings, Figure 1 shows diagrammatically the traction motors of a direct-current system with auxiliary controller circuits, including indicating mechanism. Fig. 2 shows indicating mechanism of simple form adapted for use with my system. Fig. 3 is an enlarged front view of a portion of the mechanism shown in Fig. 2. Fig. 4 is a sectional view of another indicating mechanism adapted for use in the practice of my invention. Fig. 5 is a front view partly in section on the line 5—5 of Fig. 4. Fig. 6 is a sectional view of still another form of indicating mechanism adapted for use in my invention. Fig. 7 is a cross section of the device shown in Fig. 6 on the line 7—7. Figs. 8, 9 and 10 are detail views of parts shown in Fig. 6.

The following is a description of the structure shown in the drawings:

Modern direct-current electric train equipment consists of two or four motors per car with the necessary wires and switches for coupling these motors in various combinations with relation to each other and to the source of power. In equipments calling for but a small amount of power it is usual to combine all the switches into one structure, called a controller; but where large and powerful units are used in the operation of trains, it has been found more convenient to place the switches under the car and to operate the same from a controller in the motorman's cab by means of auxiliary electric circuits, and it is such an arrangement which I have chosen to illustrate in the drawings, although my invention is not limited thereto.

The acceleration of a car or train from a state of rest in a system employing direct-current motors is usually accomplished, first, by connecting the motors in series of twos and connecting these series to the source of power for a given time (termed series running); and then changing the connections of the motors, so that all are in parallel or multiple with each other, and connecting this combination to the source of power. In this last relation the motors are retained during the period of normal or continuous running and up to the beginning of the drifting period, when the motors are disconnected from the source of power. The braking period is simply the time during which the brakes are applied to bring the train to rest. The drifting period would, of course, be the difference between the sum of the series-parallel and braking periods and the total time the train is in motion, which may be determined, if desired, in any appropriate manner.

Referring to Fig. 1, 2 is the armature and 3 the field of one direct-current motor; and 4 the armature and 5 the field of another direct-current motor.

8 is a switch which, when closed, connects the line 7 through the trolley 6, to the armature of motor 2, 3, the current passing thence, when the switch 9 is closed, through the motor 4, 5 to ground by axle 11. The motors are then in series. Similarly if the switches 8, 12 and 10 be closed, 9 being open, the current from the trolley wire will pass to ground simultaneously through motors 2, 3 and 4, 5 in parallel. The switches 8, 12, 9, and 10 are each operated electrically by means of magnet windings 13, 14, 15 and 16, respectively, and the flow of current through these windings is controlled by a switch 17 and points 18 and 19. If the switch 17 be closed through contact 18, current will flow through windings 13, 15, 20 to ground, closing the switches 8 and 9 and lifting the armature 27 of the indicating device 24. This will place the motors in series and will put the indicating device 24 in condition for operation. If the switch 17 be closed through contact 19, current from the trolley will energize magnet windings 13, 14, 16 and 21, closing switches 8, 12 and 10 and also lifting the armature 28 of the indicating device 25, thus connecting the motors in parallel and placing the indicating device 25 in condition for operation. It will of course be understood that the indicating devices 24 and 25 could be placed in the motor circuits themselves, but they would then be required to handle currents of greater magnitude and of a fluctuating nature. Assuming that the wheel 24 is on a shaft forming part of the mechanism of a wound clock, tending to rotate from right to left, it is obvious that the clock hand 30 will be held stationary as long as the armature 27 is in engagement with the wheel 24, and that the wheel 24 will rotate when the armature 27 is lifted out of engagement therewith. Such an indicating mechanism will, therefore, integrate the periods when the motors are connected in series, since only then is the armature 27 out of engagement with the wheel 24, while the indicating mechanism 25 will, in the same way, integrate the periods when the motors are in parallel relation. For determining the total period of braking, a similar indicating mechanism 26 may be included in a circuit, the closing switch of which is operated by the same air pressure that applies the brake. Such a switch is shown at 34, 35. The contact 34 is attached to a diaphragm 33 raised by air pressure to contact with the point 35 and thus to close a local circuit including the magnet 22, controlling the armature 29. The diaphragm 33 is in communication with the air brake system 36, 37, as will be readily understood.

The simple form of indicating mechanism above referred to is shown more in detail in Figs. 2 and 3. 41 is a case provided with a transparent front 42. 38 is a clock movement. 39 is the minute shaft prolonged to pass through a dial 40 carrying a pointer 30. 24 is a ratchet wheel shown attached to the minute shaft 29 for simplicity of illustration, although it would be better placed as near the escapement of the clock train as possible. 27 is the armature engaging with the teeth of the wheel 24, which armature is pivoted to the case 41 and is raised out of engagement with the said teeth by the electromagnet 20.

It is frequently desirable to combine the several indicating devices in a single structure and such combined indicating devices I have shown in Figs. 4, 5, 6 and 7. Referring to Figs. 4 and 5, 41 is a case provided with a transparent cover 42 and dial 40. Within the case is a clock movement 38 with a projecting minute shaft 39 having a bearing 43 at its outer end. Upon this shaft is rigidly fixed the gear wheel 44 having upon one side projecting teeth, or a friction surface, 45. On the same shaft is a loose sleeve 46 carrying at its outer end a gear wheel 47. Loosely mounted on the sleeve 46 is a member 48 provided with teeth, or a friction surface, standing opposite the teeth, or friction surface, 45, on the wheel 44, and at the other end a plain surface standing opposite the case. The member 48 is free to move lengthwise on the sleeve 46, but is keyed thereto by a pin 49. The gear wheel 47 meshes with gear wheel 50 carried on a sleeve 51 mounted on the shaft 53. This sleeve is provided with a pointer 52, serving to indicate the magnitude of one of the selected functions—for example, series running, multiple running, or braking. The member 48 is moved lengthwise on the sleeve 46 by the armature 28 under the influence of magnet 21 and spring 54. When moved to the right in the position shown in Fig. 4 it is in engagement with the constantly rotating wheel 44 and communicates its motion through member 48 and pin 49 to the sleeve 46 and, therefore, to pointer 52. When moved to the left-hand it is disengaged from the wheel 44 and, coming in contact with the case, its motion is arrested and the movement of the pointer ceases. On the shaft 53 is loosely mounted a gear wheel 55 which meshes with gear 44 and is, therefore, continuously rotated. On the same shaft 53 is a member 58 loosely mounted and capable of sliding longitudinally on the shaft 53 under the control of armature 27 of magnet 20. This member 58 is keyed to the shaft 53 by a pin 59, and is substantially similar to the member 48 already described in its function and mode of operation. Slidably mounted on the same shaft 53 is the member 62 which is keyed to the sleeve 63 by pin 65 and is controlled by armature 29 of magnet 22. This member is also, in function and mode of operation, substantially similar to the member 48 already described. When the member 58 is brought in contact with one face of the constantly-rotating gear-wheel 55, the shaft 53 is rotated and the pointer 61 advances. When it is out of engagement therewith this said pointer remains at rest. So, when the member 62 is moved toward the right-hand to engage with one of the faces of the gear wheel 55, the pointer 64 advances, and when it is moved out of engagement, said pointer is brought to rest. The movement of the members 58 and 62 into engagement with the constantly rotating wheel 55 is effected whenever current flows through the circuits, which include the magnets 20 or 22. They are moved out of engagement by the springs 60 and 66, when the currents in said circuits are interrupted.

Figs. 6 to 10 show another form of indicating apparatus adapted for use in my system. Referring to these figures, 41 is a suitable case provided with a transparent front 42 and dial 40 and clock movement 38. 39 is the minute shaft of the clock movement upon which is rigidly mounted the spur wheel 68 and bevel gear 69. 70 is a shaft supported at one end in the dial 40 and at the opposite end in a depression in the minute shaft 39. Upon the shaft 70 and free to revolve thereon is mounted a member 71 consisting of a bevel gear 72, of the same pitch as gear 69, and a crown of small teeth 73. Rigidly attached to the shaft 70 is an arm 75 supporting a bevel pinion 76 meshing with bevel gears 69 and 72. Also rigidly attached to the shaft 70 is a gear wheel 74 having small teeth similar to the teeth 73. 22 is a magnet and 29 its armature, rocking on pivot 77, and alternately engaging with the teeth on the gear 74, or with the teeth 73 on the member 71, depending upon its position controlled by the magnet 22 and the spring 66. To the outer end of the shaft 70 is attached the pointer 32.

The operation of the device is as follows: The clock keeps in continuous rotation the shaft 67, the gear wheel 68 and the bevel gear 69. When the armature 29 engages with the teeth 73 of the member 71, it is held stationary, and the revolution of the bevel gear 69 causes the spur wheel 76 and the shaft 75 to rotate, communicating the motion to the pointer 32. When the magnet 22 releases the armature 29, it is tilted into the position to engage with the teeth on the gear wheel 74 and releases the member 71. The shaft 70 and the pointer 32 are then held stationary and the revolution of bevel gear 69 through the spur 76 communicates a rotary motion to the member 71. These parts are duplicated three times in the registering device and a continuous motion of rotation is imparted to the members 78 and 79 by the gear wheels 90 and 89 attached to shaft 88, which is also provided with a gear wheel 87 meshing with the gear wheel 68 on the minute shaft. The spur wheels 83 and 82 of these members 79 and 78 are attached to sleeves terminating in the pointers 30 and 31, as will be readily seen from an inspection of the drawings. In the position shown in Fig. 6 the pointer 33 is being moved, owing to the engagement of the armature 29 with the teeth on the member 71, while the pointers 30 and 31 are standing stationary, owing to the engagement of the armatures 27 and 28 with the gear wheels 87 and 86 respectively.

Having thus described my invention in forms at present preferred by me, what I claim and desire to secure by Letters Patent is:

1. In a system of indicating electric train manipulation, an indicating device adapted to indicate the period of time occupied by the braking of the train, air brake mechanism, and a switch closed by the same air operating the brake mechanism whereby the indicating device is automatically actuated.

2. In a system of indicating electric train manipulation, clock mechanism including a constantly rotating element, a controller, a plurality of pointers, means for rotating said pointers, and a plurality of electromagnetic devices in the several circuits of said controller whereby the means for rotating the hands, and the hands, are actuated intermittently to indicate the periods of time occupied by selected phases of train manipulation.

In testimony whereof I have signed my name in the presence of two subscribing witnesses.

LEWIS B. STILLWELL.

Witnesses:
T. J. MANNING,
W. E. RUNDLE.